United States Patent
Kim

(10) Patent No.: US 7,502,523 B2
(45) Date of Patent: Mar. 10, 2009

(54) AUTO FOCUSING APPARATUS AND METHOD USING DISCRETE COSINE TRANSFORM COEFFICIENTS

(75) Inventor: Tae Eung Kim, Gyeonggi-do (KR)

(73) Assignee: Samsung Electro-Mechanics Co., Ltd., Kyunggi-Do (KR)

( * ) Notice: Subject to any disclaimer, the term of this patent is extended or adjusted under 35 U.S.C. 154(b) by 572 days.

(21) Appl. No.: 11/165,767

(22) Filed: Jun. 23, 2005

(65) Prior Publication Data

US 2006/0127077 A1    Jun. 15, 2006

(30) Foreign Application Priority Data

Dec. 9, 2004    (KR) .................... 10-2004-0103833

(51) Int. Cl.
- G06K 9/46    (2006.01)
- G06K 9/40    (2006.01)
- H04N 5/228   (2006.01)
- G03B 17/00   (2006.01)
- G03B 3/00    (2006.01)

(52) U.S. Cl. .................. 382/255; 382/250; 348/208.12; 396/77; 396/89

(58) Field of Classification Search .................. 396/77, 396/79, 89; 382/232, 248–250, 254–275; 348/208.12, 345
See application file for complete search history.

(56) References Cited

U.S. PATENT DOCUMENTS

| | | | |
|---|---|---|---|
| 5,065,246 A * | 11/1991 | Takemoto et al. ........... | 348/354 |
| 5,105,278 A * | 4/1992 | Takemoto .................... | 348/356 |
| 5,357,281 A | 10/1994 | Ikeda et al. | |
| 5,598,484 A * | 1/1997 | Suzuki et al. ................ | 382/239 |
| 6,289,127 B1 * | 9/2001 | Ikeda ......................... | 382/232 |
| 6,298,166 B1 | 10/2001 | Ratnakar et al. | |
| 6,347,118 B1 * | 2/2002 | Takayama ................... | 382/250 |
| 6,512,791 B1 * | 1/2003 | Takayama ............. | 375/240.01 |
| 7,103,228 B2 * | 9/2006 | Kraft et al. .................. | 382/274 |
| 7,224,397 B2 * | 5/2007 | Sasaki ........................ | 348/348 |
| 2002/0041716 A1 * | 4/2002 | Bruna et al. ................ | 382/250 |
| 2004/0008897 A1 * | 1/2004 | Easwar ....................... | 382/250 |
| 2004/0061801 A1 | 4/2004 | Hata | |

FOREIGN PATENT DOCUMENTS

| | | |
|---|---|---|
| EP | 1128666 | 8/2001 |
| JP | 4248769 | 9/1992 |
| JP | 6090396 | 3/1994 |
| JP | 6245127 | 9/1994 |
| JP | 06-303490 | 10/1994 |
| JP | 09159906 | 6/1997 |
| JP | 2004-070226 A | 3/2004 |

OTHER PUBLICATIONS

J. Baina and J. Dublet, "Automatic Focus and Iris Control for Video Cameras", 1995, IEE, pp. 232-235.*
English Abstract of Korean Patent Application No. 99-60177 published on Jul. 9, 2001.

* cited by examiner

*Primary Examiner*—Matthew C Bella
*Assistant Examiner*—Manav Seth
(74) *Attorney, Agent, or Firm*—Darby & Darby P.C.

(57) ABSTRACT

Disclosed herein is an auto focusing apparatus and method for a camera. The auto focusing apparatus includes an image sensor unit, an Image Signal Processor (ISP) unit, a compression module, a focus value calculating unit, and an auto focus Digital Signal Processor (DSP).

14 Claims, 7 Drawing Sheets

| c00 | c01 | c02 | c03 | c04 | c05 | c06 | c07 |
|-----|-----|-----|-----|-----|-----|-----|-----|
| c10 | c11 | c12 | c13 | c14 | c15 | c16 | c17 |
| c20 | c21 | c22 | c23 | c24 | c25 | c26 | c27 |
| c30 | c31 | c32 | c33 | c34 | c35 | c36 | c37 |
| c40 | c41 | c42 | c43 | c44 | c45 | c46 | c47 |
| c50 | c51 | c52 | c53 | c54 | c55 | c56 | c57 |
| c60 | c61 | c62 | c63 | c64 | c65 | c66 | c67 |
| c70 | c71 | c72 | c73 | c74 | c75 | c76 | c77 |

FIG. 5C

| DC | ac01 | ac02 | ac03 | ac04 | ac05 | ac06 | ac07 |
|---|---|---|---|---|---|---|---|
| ac10 | ac11 | ac12 | ac13 | ac14 | ac15 | ac16 | ac17 |
| ac20 | ac21 | ac22 | ac23 | ac24 | ac25 | ac26 | ac27 |
| ac30 | ac31 | ac32 | ac33 | ac34 | ac35 | ac36 | ac37 |
| ac40 | ac41 | ac42 | ac43 | ac44 | ac45 | ac46 | ac47 |
| ac50 | ac51 | ac52 | ac53 | ac54 | ac55 | ac56 | ac57 |
| ac60 | ac61 | ac62 | ac63 | ac64 | ac65 | ac66 | ac67 |
| ac70 | ac71 | ac72 | ac73 | ac74 | ac75 | ac76 | ac77 |

FIG. 5D

| DC | ac01 | 0 | ac03 | 0 | 0 | 0 | 0 |
|---|---|---|---|---|---|---|---|
| ac10 | 0 | 0 | 0 | 0 | 0 | 0 | 0 |
| 0 | 0 | 0 | 0 | 0 | 0 | 0 | 0 |
| 0 | ac31 | 0 | 0 | ac34 | ac35 | 0 | 0 |
| 0 | 0 | 0 | 0 | 0 | 0 | 0 | 0 |
| ac50 | 0 | ac52 | 0 | 0 | 0 | 0 | 0 |
| 0 | 0 | 0 | 0 | 0 | 0 | 0 | 0 |
| 0 | 0 | 0 | 0 | ac74 | 0 | 0 | 0 |

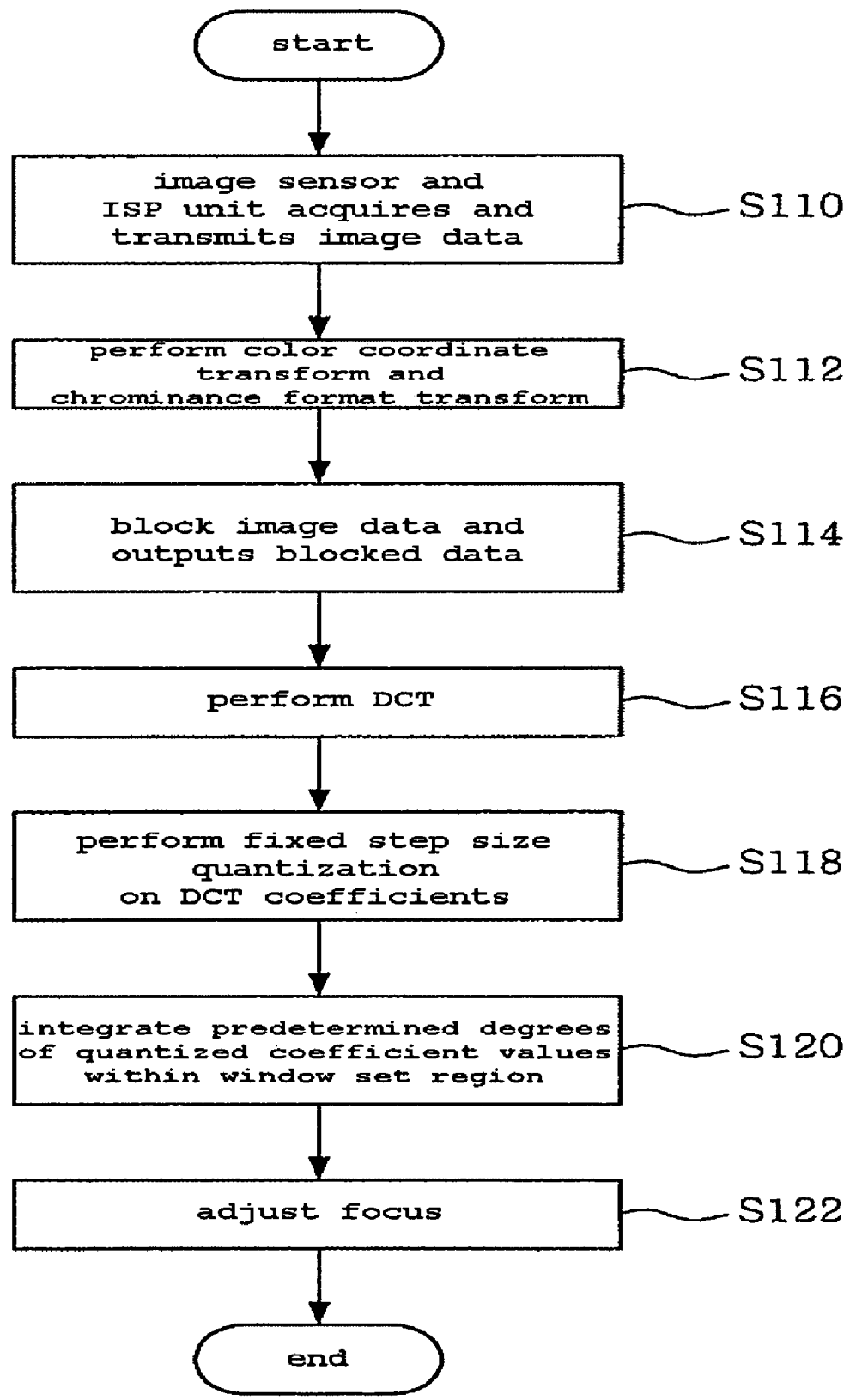

AUTO FOCUSING APPARATUS AND METHOD USING DISCRETE COSINE TRANSFORM COEFFICIENTS

The present application claims priority under 35 U.S.C. §119 to Korean Patent Application No. 10-2004-0103833 filed on Dec. 9, 2004. The content of the application is incorporated herein by reference in its entirety.

BACKGROUND OF THE INVENTION

1. Field of the Invention

The present invention relates generally to an auto focusing apparatus and method for a camera and, more particularly, to an auto focusing apparatus and method for a camera, which allows a camera module, which is mounted on a mobile phone, a smart phone, a personal digital assistant or the like, to acquire discrete cosine transform coefficients from a compression module, and to adjust the focus of a lens based on the acquired coefficients.

2. Description of the Related Art

Recently, with the rapid development of an information society, the development of a composite mobile communication terminal, in which a variety of functions are provided, is required in addition to a mobile communication terminal that merely transmits voice.

Accordingly, to meet the demands of the multimedia age, a composite mobile communication terminal, in which a function of transmitting and receiving images is combined with a function of transmitting and receiving voice, has been implemented.

Such a composite mobile communication terminal is exemplified by a camera phone, in which a digital camera function is implemented in a mobile communication terminal (so-called mobile phone) that is usually carried by a user.

When a user suddenly desires to take and keep a photograph of a certain scene or a subject required for business use, the camera phone allows the photograph to be taken and stored therein.

Furthermore, the camera phone allows the photographed image to be wirelessly transmitted through a mobile communication terminal to another mobile communication terminal, and the photographed image can be output onto the screen of a Personal Computer (PC) and stored in the PC when mobile communication terminal is connected to the PC.

A technology regarding a camera phone is disclosed in Korean Pat Appl. No. 99-60177, entitled "Photographed image transmission method for camera phone."

Furthermore, recently, a mobile communication terminal (so-called Television (TV) phone) that is capable of receiving and outputting TV broadcasting programs, and a mobile communication terminal that is capable of downloading Internet information and displaying moving images when connected to the Internet have been developed. A next generation mobile communication terminal that allows all the functions of the mobile communication terminals to be performed is being developed.

The construction of a typical camera phone includes a camera module for photographing images, a transmission module for transmitting a user's voice and image, and a reception module for receiving the counterpart's voice and image.

The camera module includes a lens subsystem and an image processing subsystem.

The lens subsystem includes a lens unit composed of a zoom lens and a focus lens, an actuator for driving the zoom and focus lenses, and an actuator driver.

The image processing subsystem includes an image sensor and Image Signal processor (ISP) unit, and an auto focus Digital Signal Processor (DSP).

The lens subsystem focuses on a scene to be photographed, and allows light, which is incident on a specific region having a predetermined range from the scene, to come into contact with an image sensor.

The image sensor of the image processing subsystem includes photo-cells that accumulate charges as the light comes into contact with the image sensor during a specific absorption period, convert the accumulated charges into a digital value (pixel value), and output a resulting digital value.

The ISP unit of the image processing subsystem performs image processing, such as compression and scaling image enhancement, on acquired digital values corresponding to pixels, and transmits resulting values to a mobile phone main body.

In this case, the lens subsystem adjusts the focus of a lens to photograph a sharp image using an auto focus device similar to that utilized in a typical photo or digital camera without change. The method is briefly described below.

Generally, when the composition of a subject that is intended to be photographed is set and then a release button is operated, an auto focus device in a photographing apparatus, such a photo camera or a digital camera, takes a picture while automatically focusing on the subject.

The auto focus device employs an active method and a passive method.

The active method is a method of measuring a distance to a subject by emitting infrared rays or ultrasonic waves and sensing incident rays or waves that are reflected from the subject.

The passive method is a method of determining a distance to a subject by receiving light that is emitted from the subject through the lens unit under natural illumination without a separate emission unit that emits light, and using the light and darkness difference of the subject.

That is, the passive method performs an auto focus adjustment function in such a way as to detect a high band frequency signal, which is a component proportional to contrast obtained by passing the luminance signal of an image signal output from an image sensor through a high-band filter, for each frame, to move a focus lens in a direction that increases the contrast while comparing the obtained contrast with the contrast of a previous frame, and to stop the rotation of a focus lens actuator in a state of maximum contrast.

FIG. 1 is a block diagram showing the construction of a camera module in which a conventional auto focus adjustment apparatus is included. The camera module includes a lens unit 11, an image sensor and ISP unit 12, an auto focus DSP 14, an actuator driver 15, and an actuator 16.

The lens unit 11 includes a zoom lens and a focus lens. The zoom lens is a lens for magnifying an image, and the focus lens is a lens for focusing an image.

The image sensor employs a sensor using a Charge Coupled Device (CCD) or a Complementary Metal Oxide Semiconductor (CMOS). The ISP is a part for performing image processing, such as auto white balancing, auto exposure, and gamma correction, so that an image is converted to fit human vision.

The image sensor and ISP unit 12 converts image-processed data into a CCIR656 or CCIR601 format (YUV space), receives a master clock from a mobile phone host 13, and then outputs image data Y/Cb/Cr or R/G/B to the mobile phone host 13 along with a vertical synchronization signal Vsync, a horizontal synchronization signal Hsync and a pixel clock Pixel_Clock.

The auto focus DSP 14 includes an Optical Detection Module (ODM) and a Central Processing Unit (CPU) for performing an auto focus algorithm based on the resulting values of the ODM.

In this case, the ODM is generally composed of a high band-pass digital filter, an integrator, and a window control block.

When the auto focus DSP 14 receives image data from the image sensor and ISP unit 12 and passes the received image data through the high band-pass digital filter, only the edge components of an image are extracted.

In this case, with respect to a window set region, a window control block receives the start and end positions of the window, and integrates the output values of the high band-pass digital filter inside the window in the integrator. Focus values obtained by the integration are used as reference data to adjust a focus in the camera module.

Generally, for a still image, the focus is adjusted by moving the lens unit 11. For the same image, when the image is in focus, a focus value becomes high. In contrast, when the image is out of focus, a focus value becomes low.

Referring to FIG. 2, when the same image is input to a camera, a low focus value is generated, as in regions "A" or "C," when the image is out of focus, and a high focus value is generated, as in a region "B," when the image is in focus. Meanwhile, for a complex image, the focus values in the region "B" are higher, and for a simple image, the focus values in the region "B" are lower. Generally, a camera is focused on the center of an image, and a window is placed on the basis of the center.

To find the maximal focus value of a screen, the actuator driver 15 causes the lens unit 11 to move by operating the actuator 16. The location where the focus value is maximal, as shown in FIG. 2, must be found by moving the lens unit 11.

The camera module determines whether to move the lens unit 11 forward or backward and controls the actuator driver 15 by executing an algorithm to find the maximal focus value in the CPU.

Meanwhile, in a mobile communication terminal, an auto focus adjustment device must be implemented using integrated circuits that require minimal cost and space. Ideally, an auto focus adjustment method is not be implemented using specific circuits that only automatically adjust a focus, but must be implemented using components that are also used for other purposes in an image apparatus.

SUMMARY OF THE INVENTION

Accordingly, the present invention has been made keeping in mind the above problems occurring in the prior art, and an object of the present invention is to provide an auto focusing apparatus and method for a camera, which allow a camera module that is mounted on a mobile phone, a smart phone, a Personal Digital Assistant (PDA) or the like, to acquire needed information from a compression module and to adjust the focus of a lens based on the information.

In order to accomplish the above object, the present invention provides an auto focusing apparatus for a camera, including an image sensor unit for transforming an optical signal into an electrical signal; an Image Signal Processor (ISP) unit for receiving the electrical signal from the image sensor unit and outputting digitized image data; a compression module containing memory, the compression module classifying image data according to frame when the image data are input, blocking each frame into a plurality of blocks having a predetermined size, performing Discrete Cosine Transform coefficient (DCT) on the blocks and then outputting DCT values related to the blocks; a focus value calculating unit for receiving DCT coefficient values related to the plurality of blocks of a frame, quantizing the received DCT coefficient values using a fixed step size with respect to blocks in a window set region, and calculating focus values by integrating predetermined degrees of quantized DCT coefficient values; and an auto focus Digital Signal Processor (DSP) for detecting a maximal focus value while moving a focus lens, and performing auto focus adjustment when the focus values are input from the focus value calculating unit.

In addition, the present invention provides a method of automatically adjusting a focus of a camera, including the step of an image sensor and ISP unit acquiring image data according to frame, and transmitting the image data to the compression module; the step of a compression module blocking a frame into a plurality of blocks having a predetermined size, performing DCT on the blocks, and outputting DCT coefficients; the step of a focus value calculating unit performing a fixed step size quantization and calculating focus values by integrating predetermined degrees of quantized DCT coefficient values related to blocks within the window when the block-based DCT coefficients are received from the compression module; and the step of an auto focus DSP receiving the focus values that are calculated at the third step, calculating a maximal focus value while moving the focus lens of a focus lens unit, and then performing auto focus adjustment.

BRIEF DESCRIPTION OF THE DRAWINGS

The above and other objects, features and advantages of the present invention will be more clearly understood from the following detailed description taken in conjunction with the accompanying drawings, in which:

FIG. 5C is a view showing the distribution of DCT coefficients that are output from the frequency conversion unit of FIG. 3;

FIG. 5D is a view showing values that are output from the quantizer of FIG. 3;

FIG. 6 is a flowchart illustrating a method of automatically adjusting the focus of a camera using DCT coefficients according to an embodiment of the present invention.

DESCRIPTION OF THE PREFERRED EMBODIMENTS

Figure 1:
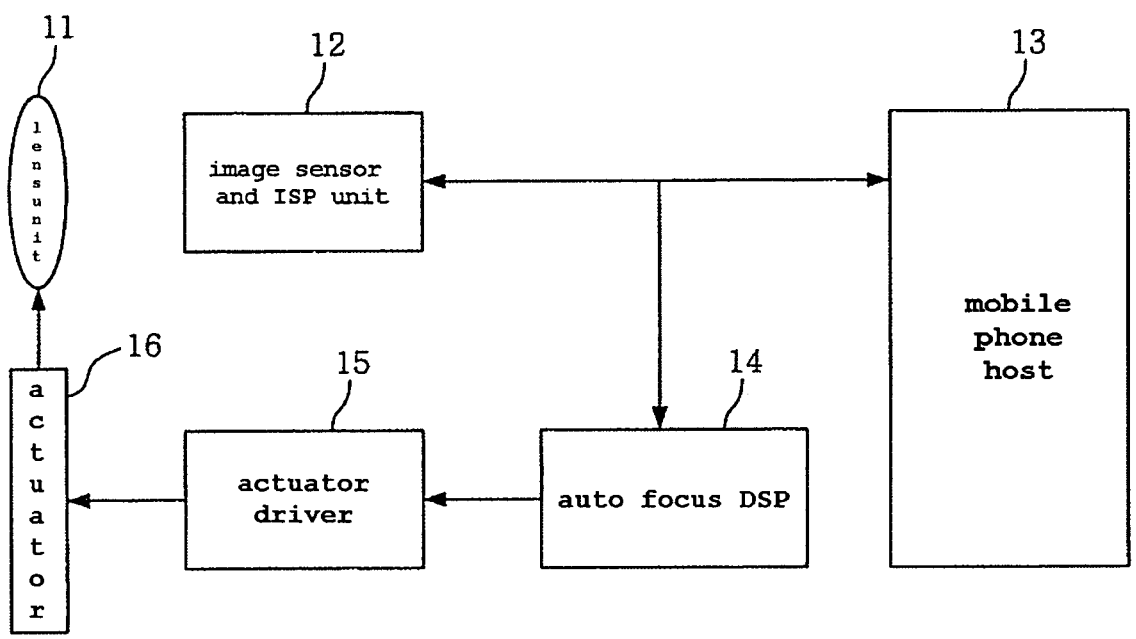
FIG. 1 is a block diagram showing the construction of a camera module in which a conventional auto focus adjustment apparatus is included.
Figure 2:
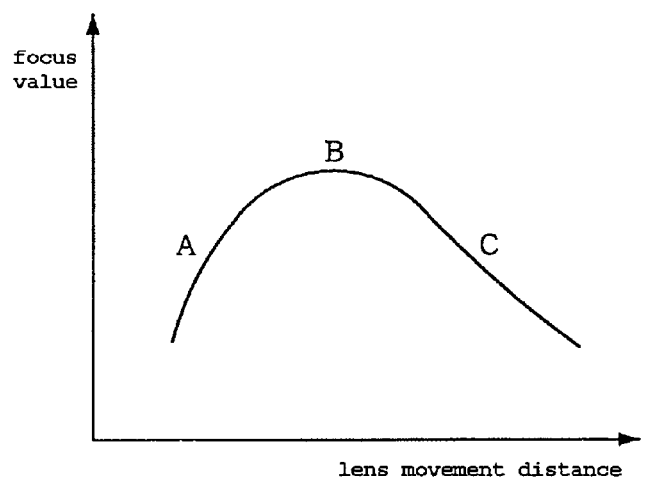
FIG. 2 is a view illustrating a conventional method of automatically controlling a focus.

Reference now should be made to the drawings, in which the same reference numerals are used throughout the different drawings to designate the same or similar components.

Figure 3:
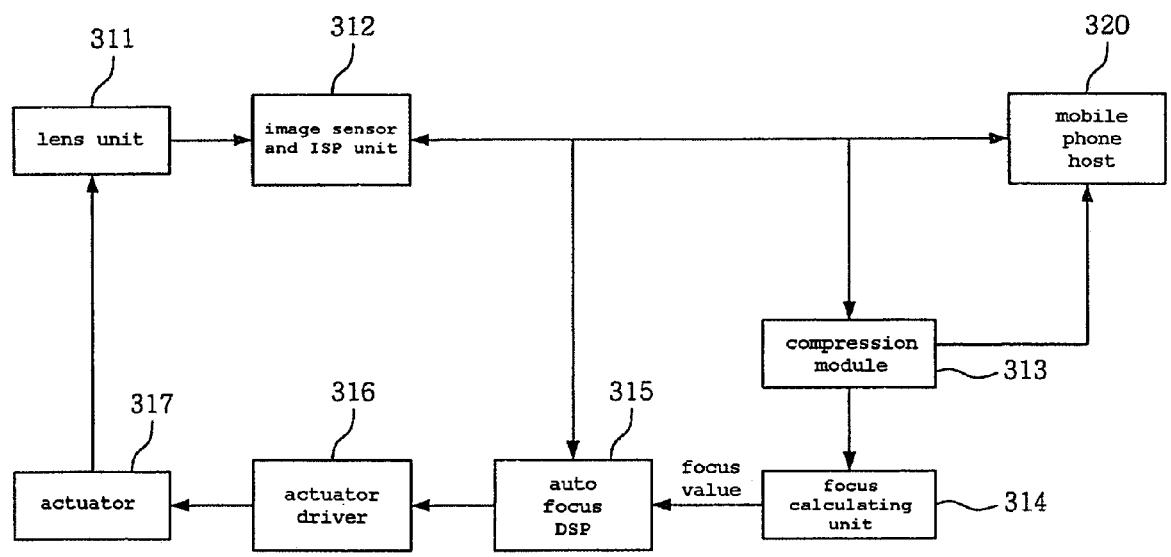
FIG. 3 is an auto focus adjustment apparatus using Discrete Cosine Transform (DCT) coefficients according to an embodiment of the present invention.
Figure 4:
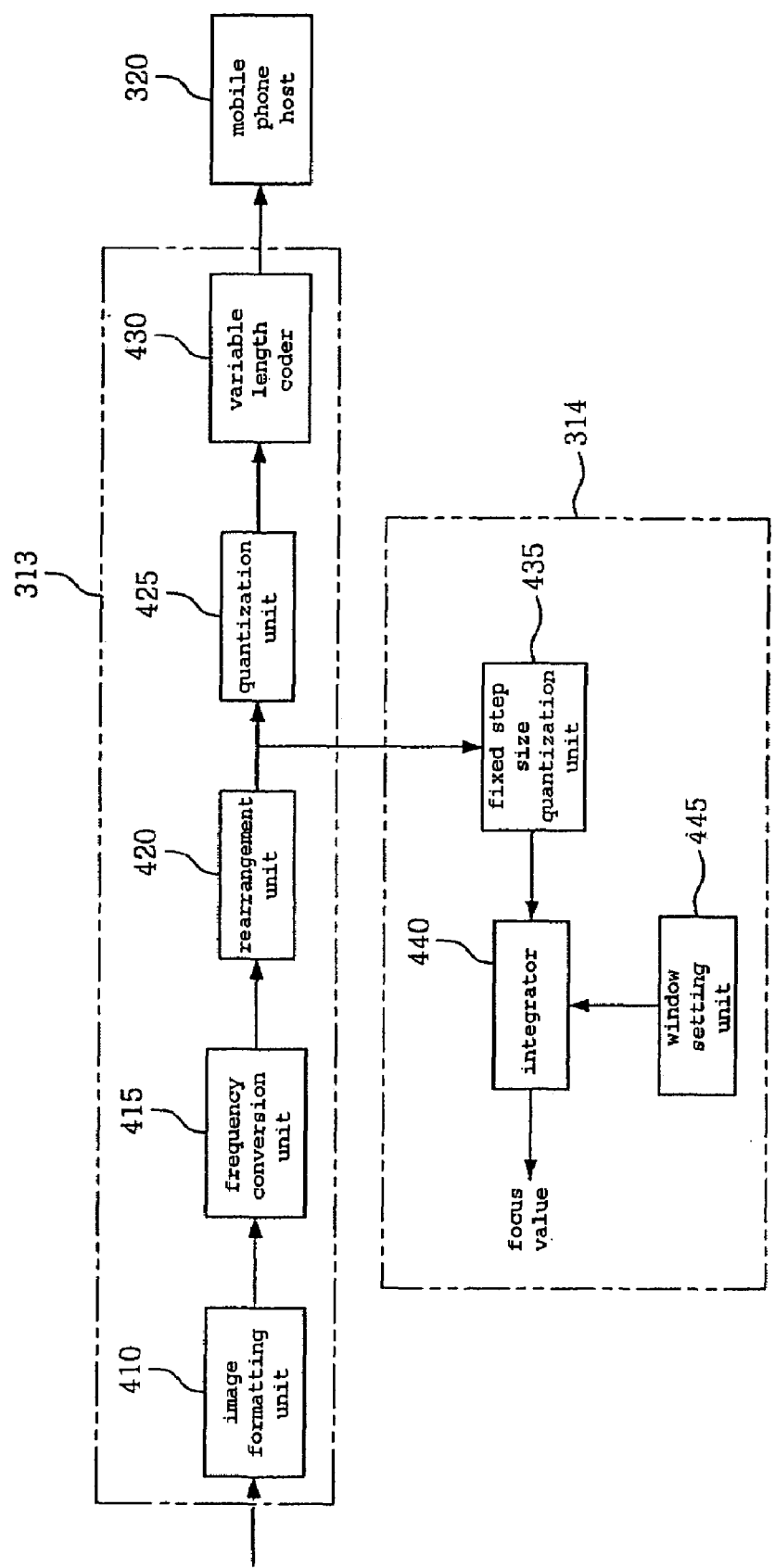
FIG. 4 is a block diagram showing the compression module and focus value calculating unit of FIG. 3 in detail.

FIG. 3 is an auto focus adjustment apparatus using DCT coefficients according to an embodiment of the present invention.

Referring to FIG. 3, the auto focus adjustment apparatus using DCT coefficients according to an embodiment of the present invention includes a lens unit 311, an image sensor and ISP unit 312, a compression module 313, a focus value calculating unit 314, an auto focus DSP 315, an actuator driver 316, and an actuator 317. The image sensor and ISP unit 312 is formed in a single body. Furthermore, the image sensor and ISP unit 312 may be separated into an image sensor and an image signal processor.

The lens unit 311 includes a zoom lens and a focus lens. The zoom lens is a lens for magnifying an image, and the focus lens is a lens for focusing an image.

The image sensor and ISP unit 312 employs a Charge-Coupled Device (CCD) image sensor or Complementary Metal Oxide Semiconductor (CMOS) image sensor for converting an optical signal into an electrical signal. The ISP improves image quality by converting image data to suit human visual capability, and outputs image data with improved image quality.

The CCD image sensor is formed by arranging a plurality of ultra small size metallic electrodes on a silicon wafer. The CCD image sensor is composed of a plurality of photodiodes, and converts optical energy into an electrical signal when the optical signal is applied to the plurality of photodiodes.

Since the CCD image sensor transmits charges, which are generated in photodiodes that correspond to pixels, to an amplifier through vertical and horizontal transfer CCDs using a high potential difference, it is characterized in that its power consumption is high, but it is robust against noise and performs uniform amplification.

In contrast, the CMOS image sensor is formed by arranging photodiodes and amplifiers to correspond to individual pixels. The CMOS image sensor has low power consumption and can be manufactured to have a small size, but is disadvantageous in that its image quality is low.

The types of CCD and CMOS image sensors are various, and their ISP interfaces and characteristics are different according to manufacturing company. Accordingly, an image signal processor is designed and manufactured for a specific sensor.

The image signal processor performs image processing, such as color filter array interpolation, color matrix processing, color correction and color enhancement.

In this case, a signal that is used as the synchronization signal of each image frame includes a vertical synchronization signal Vsync indicating the start of an image frame, a horizontal synchronization signal Hsync indicating the active state of an image in each line within an image frame, and a pixel clock signal pixel_clock indicating the synchronization of pixel data. Pixel data with respect to an actual image are formed in the form of pixel_data.

The image sensor and ISP unit 312 converts image-processed data into a CCIR656 or CCIR601 format (YUV space), receives a master clock from a mobile phone host 330, and then outputs image data Y/Cb/Cr or R/G/B to the mobile phone host 320 along with a vertical synchronization signal Vsync, a horizontal synchronization signal Hsync and a pixel clock Pixel_Clock.

The compression module 313 compresses and outputs the image data received from the image sensor and ISP unit 312, and the internal block diagram of the compression module 313 is shown in FIG. 5. The compression module 313 includes an image formatting unit 410, a frequency conversion unit 415, a rearrangement unit 420, a quantization unit 425 and a variable length coder 430.

The image formatting unit 410 receives the output of the image signal processor, and outputs pixel_data in the form of YCbCr 4:2:2 or YCbCr 4:2:0, which has CCIR656 or CCIR601 format, and the vertical and horizontal signals of one frame so that appropriate input is provided for later image processing.

For this purpose, the image formatting unit 410 performs color coordinate conversion, that is, converts RGB format data into YCbCr or YUV format. For example, CCIR-601 YCbCr color space conversion formulas are expressed as follows:

$Y=(77R+150G+29B)/256$ Range: 16~235

$Cb=(-44R-87G+131B)/256+128$ Range: 16~240

$Cr=(131R-110G-21B)/256+128$ Range: 16~240

Figures 5A, 5B:
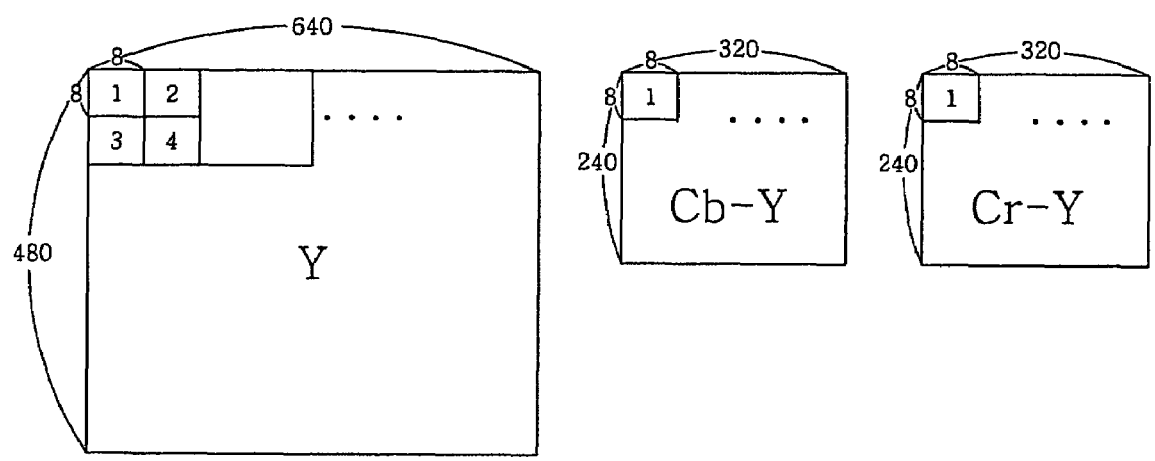
FIG. 5A is a view illustrating the calculation values of the image formatting unit of FIG. 3.
FIG. 5B is a view showing a blocked image signal that is input to the frequency conversion unit of FIG. 3.

The image formatting unit 410 performs a chrominance format conversion on YCbCr format data converted as described above, so that YCbCr 4:4:4 format data are converted into YCbCr 4:2:2 format or YCbCr 4:2:2 format and are then output. FIG. 5A shows YCbCr that is output when the number of pixels of one frame is 640×480.

In the 4:2:0 format of FIG. 5A, a Y signal is output in the form of 640×480 pixels in the order of allocated reference numbers, a Cb signal is output in the form of 320×240 pixels that are halved in each dimension compared to the Y signal, and a Cr signal is also output in the form of 320×240 pixels that are halved in each dimension compared to the Y signal.

The chrominance format conversion of the image formatting unit 410 is based on the low spatial sensitivity of eyes to color. Studies have proven that color component sub-sampling using four factors in horizontal and vertical directions is appropriate. Accordingly, an image signal can be represented by four luminance components and two chrominance components.

Furthermore, the image formatting unit 410 contains frame memory, and transmits the data of a two-dimensional 8×8 block while varying memory addresses for Y/Cb/Cr pixel data that are input in a horizontal direction. Specifically, the image formatting unit 410 transmits a composite YCbCr on the basis of a macro block that is composed of a plurality of 8×8 blocks.

That is, the image formatting unit 410 blocks an input image signal to correspond to a unit region (a block) that is composed of a predetermined number of pixels, and outputs the blocked image signal. In this case, the block is a region of a predetermined size in a picture, which is a unit of a process of encoding image signals, and is composed of a predetermined number of pixels.

A conversion example of the image formatting unit 410 is shown in FIG. 5B, in which an input image signal is blocked into a plurality of 8×8 blocks. In this case, 8 bits may be used as the value of each 8×8 block.

Then, the frequency conversion unit 415 frequency-transforms the blocked image signal using Discrete Cosine Transform (DCT) and then outputs a frequency component that corresponds to each block.

The DCT used in the above case divides pixel values irregularly distributed throughout a screen into various frequency components ranging from a low frequency component to a high frequency component by transforming the pixel values, and concentrates the energy of an image on lower frequency components.

DCT, which has been established as a core technique of various international standards, such as H.261, JPEG and MPEG, is performed on an 8×8 size block basis. The basic scheme of DCT is based on the concept of space, and DCT is a core technique of H.261, JPEG and MPEG that are multimedia-related international standards.

The basic scheme of the DCT divides data having high spatial correlation into a plurality of frequency components ranging from a low frequency component to a high frequency component using orthogonal transform, and differently quantizes individual frequency components. An equation for 8×8 DCT and IDCT operations is expressed as follows:

$$F(u, v) = \frac{1}{4}c(u)c(v)\sum_{x=0}^{7}\sum_{y=0}^{7} f(x, y)\cos\frac{(2x + 1)u\pi}{16}\cos\frac{(2y + 1)v\pi}{16} \quad (1)$$

$$f(x, y) = \frac{1}{4}\sum_{u=0}^{7}\sum_{v=0}^{7} c(u)c(v)F(u, v)\cos\frac{(2x + 1)u\pi}{16}\cos\frac{(2y + 1)v\pi}{16}$$

$$c(u) = \begin{cases} \frac{1}{\sqrt{2}} & u = 0 \\ 1 & u \neq 0 \end{cases} \quad c(v) = \begin{cases} \frac{1}{\sqrt{2}} & v = 0 \\ 1 & v \neq 0 \end{cases}$$

where F(u,v) of the DCT operation denotes the frequency component of a block, F(0,0) denotes a low frequency component, and the components other than the F(0,0) denote high frequency components. As the orthogonal-transformed data are away from a low frequency component, the orthogonal transformed data have a higher frequency component. That is, the DCT allows the energy of the blocks to be moved so that a compression effect can be increased because most of energy is concentrated on the low frequency component of a frequency domain. FIG. 5C is a view showing the arrangement of the DCT coefficients in the case of 8×8 block, where DC denotes a low frequency component, and ac01~ac77 denote high frequency components.

The rearrangement unit 420 rearranges input data in the range from a low frequency component to a high frequency component and outputs rearranged data. That is, DCT coefficients are rearranged in the order of ac01, ac10, ac20, . . . , ac77a by performing zigzag scan along the dotted line of FIG. 5C.

Thereafter, the rearranged data are input to the quantization unit 425 and are quantized therein. The quantization parameter varies according to block and DCT coefficient.

In this case, the quantization parameter is a parameter that represents the size of a quantization step, and the quantization step is almost proportional to the quantization parameter. That is, when the quantization parameter is large, the quantization step is rough, so that the absolute value of the quantization component becomes small. Accordingly, since the zero run (the length of components having a zero value that are continuously arranged) of the quantization component is lengthened, the absolute value of a level value decreases.

In contrast, when the quantization parameter is small, the quantization step becomes fine and, thus, the absolute value of a quantization component becomes large. Accordingly, the zero run is shortened, so that the absolute value of the level value becomes large.

Generally, high frequency components represent the fine portions of an image due to the perception capability of humans. Since the loss of some high frequency components has such a small effect on image quality that human eyes cannot sense it, low frequency components, containing much information, are finely quantized with a quantization size decreased, but high frequency components are quantized with the quantization size increased, so that compression efficiency can be maximized at the expense of only slight loss of image quality.

Figure 5E:
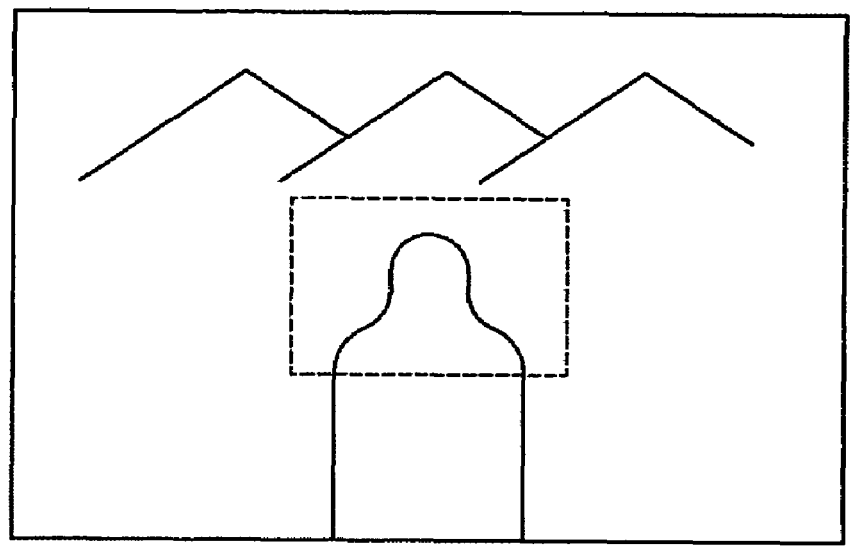
FIG. 5E is a view illustrating a window used by the focus value calculating unit.

The data quantized in the quantization unit 425 as described above, possessing much data that are converted into "0," are input to the variable length coder 430 and are then converted into compressed code therein. For example, FIG. 5E shows quantized DCT coefficients, including DC, ac01, ac10, 0, 0, 0, ac03, 0, 0, ac31, 0, ac50, 0, 0, 0, 0, 0, 0, 0, 0, 0, 0, 0, 0, 0, ac52, . . . , that is, DC, ac01, ac10, three 0s, ac03, two 0s, ac31 and one 0, ac50s, fourteen 0s, . . . .

The variable length coder 430 allocates code to the quantization components using numerical values representing the sizes of the quantization components and a code table representing correspondence to the code, and converts the quantization components of individual blocks into a coded stream.

Meanwhile, a fixed step size quantization unit 435 receives DCT coefficients from the rearrangement unit 420, and quantizes the received DCT coefficients after dividing them by a predetermined quantization step size. That is, the fixed step size quantization unit 435 fixes the quantization size and performs quantization on the received DCT coefficients. Generally, the quantization size varies with high frequency and low frequency as well as pixel. The fixed step size quantization unit 435 performs quantization after dividing them by a predetermined quantization step size.

In this case, the fixed step size quantization unit 435 inputs only the Y signal, but does not receive the Cb/Cr signal.

As described above, the fixed step size quantization unit 435 receives the DCT coefficients from the rearrangement unit 420, quantizes the received DCT coefficients using the fixed quantization size, and then outputs the quantized DCT coefficients. Alternately, the fixed step size quantization unit 435 may receive the DCT coefficients from the frequency conversion unit 415 and use them.

The integrator 440 integrates and outputs coefficients that have passed through the fixed step size quantization unit 435. In this case, coefficients that must be integrated are values regarding pixels that are located on the center region of a frame, and only coefficients that are included in a region (window) selected by a window adjusting unit 445 are integrated. The selected region is shown in FIG. 5E. Generally, a camera is focused on the center of an image, and a window is placed on the basis of the center.

In this case, the integrator 440 performs integration on the coefficients of the high frequency components, specifically, it performs the integration on predetermined degrees of high frequencies and extracts a focus value. That is, it is desirable that the predetermined degrees of coefficients, that is, ac01 and ac10, be taken among aC1~ac77 in FIG. 5C. Furthermore, ac20~ac02 or ac01~ac02 may be taken.

As described above, the degrees of the high frequency can be arbitrarily determined. As the degree becomes higher, the accuracy of the focus value increases, but the calculation becomes complicated, so that it is desirable that a range of appropriate degrees is selected.

Furthermore, in accordance with another embodiment of the present invention, to obtain a focus value, the integrator 440 does not perform the integration by adding the coefficients of high frequencies regarding to one frame, but performs the integration by adding the coefficients of high frequencies regarding a plurality of frames.

Calculation becomes complicated due to a large amount of calculations when the integration is performed according to another embodiment of the present invention. However, the accuracy increases as the integration becomes more complicated.

Thereafter, the window adjusting unit 445 sets a window to obtain the focus values as shown in FIG. 5E. Generally, a camera is focused on the center of an image, and a window is placed on the basis of the center.

In this case, with respect to the window set region on the image, the start and end positions of the window are input to the integrator 440.

When receiving the DCT coefficients, the integrator 440 determines whether the DCT coefficients correspond to the blocks of a window set region, determines whether the DCT coefficients correspond to predetermined degrees of the coefficients if they corresponds to the block of the window set region, and integrates all the blocks of the window set region corresponding to predetermined degrees of the coefficients, and outputs an integrated value to the auto focus DSP 315 as the focus value.

Meanwhile, the auto focus DSP 315 receives the focus values from the focus value calculating unit 314, and determines a focus while driving the focus lens forward or backward.

Figure 5F:
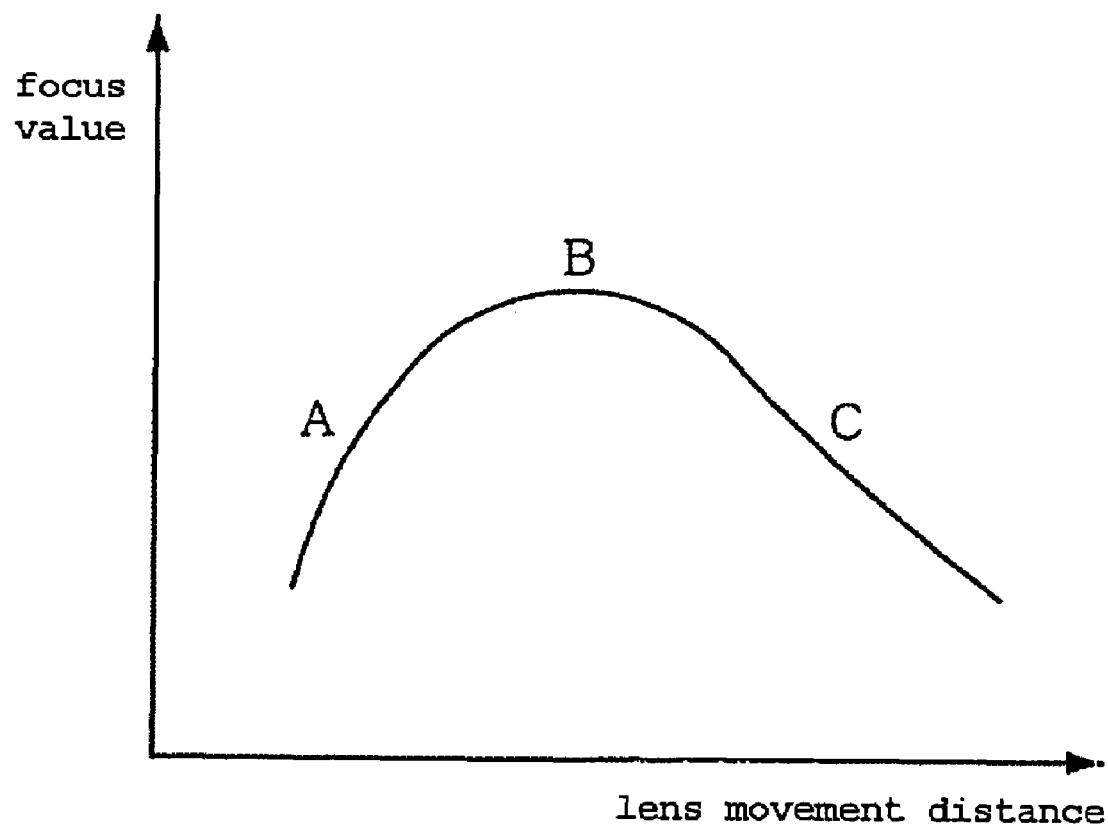
FIG. 5F is a view illustrating focus adjustment using focus values.

In FIG. 5F, when the same image is input to a camera, a low focus value is generated, as in regions "A" or "C," when the image is out of focus, and a high focus value is generated, as in a region "B," when the image is in focus.

Meanwhile, for a complex image, the focus values in the region "B" are higher, and for a simple image, the focus values in the region "B" are lower.

To find the maximal focus value of a screen, the lens unit 311 is moved by operating the actuator 317 using the actuator driver 316. The location where the focus value is maximal, as shown in FIG. 5F, must be found by moving the lens unit 311.

The camera module of the present invention determines whether to move the lens unit 311 forward or backward and controls the actuator driver 316 by executing an algorithm that finds the maximal focus value in the auto focus DSP 315.

In this case, the actuator driver 316 moves the lens unit 311 by operating the actuator 317 according to the control of the auto focus DSP 315.

FIG. 6 is a flowchart illustrating a method of automatically adjusting the focus of a camera according to an embodiment of the present invention.

First, the image sensor and ISP 312 acquires image data on a frame basis, and transmits the image data to the compression module 313 at step S110.

Then, the image formatting unit 410 of the compression module 313 performs color coordinate transform and chrominance format transform, blocks an input image signal into blocks so that the input image signal corresponds to unit regions (blocks) each composed of a predetermined number of pixels, and outputs the blocked image signal at steps S112 and S114.

Thereafter, the frequency conversion unit 415 frequency-transforms the blocked image signal using DCT, and outputs frequency components that correspond to individual blocks at step S116.

Thereafter, the fixed step size quantization unit 435 receives DCT coefficients from the frequency conversion unit 415, and quantizes the received DCT coefficients DCT by dividing them by a predetermined quantization step size at step S118. That is, the fixed step size quantization unit 435 performs quantization on the received DCT coefficients using a fixed quantization size. Generally, the quantization size varies according to high frequency and low frequency as well as with pixel, and the fixed step size quantization unit 435 performs quantization by dividing it by a predetermined quantization step size.

In this case, the fixed step size quantization unit 435 inputs only the Y signal, but does not receive the Cb/Cr signal.

Thereafter, the integrator 440 integrates and outputs coefficients that have passed through the fixed step size quantization unit 435. In this case, the coefficients that must be integrated are values with respect to pixels that are located in the center region of a frame, and only the coefficients that are included in a region (window) selected by the window adjusting unit 445 are integrated at step S120.

Meanwhile, the auto focus DSP 315 receives focus values from the focus value calculating unit 314, and determines the maximal focus while moving driving the focus lens forward and backward at step S122.

As described above, in accordance with the present invention, the camera module can transmit compressed data to an image apparatus, such as a mobile phone, because it includes the image compression unit in the auto focusing apparatus, and additional hardware for extracting focus values is not required because the camera module extracts a focus value, which is used to execute an auto focus operation, using the DCT coefficients of the image compression device.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An auto focusing apparatus for a camera, comprising:
    an image sensor unit for transforming an optical signal into an electrical signal;
    an Image Signal Processor (ISP) unit for receiving the electrical signal from the image sensor unit and outputting digitized image data;
    a compression module containing memory, the compression module classifying image data according to frame when the image data are input, blocking each frame into a plurality of blocks having a predetermined size, performing Discrete Cosine Transform (DCT) on the individual blocks and then outputting DCT values related to the blocks;
    a focus value calculating unit for receiving DCT coefficient values related to the plurality of blocks of a frame, quantizing the received DCT coefficient values using a fixed step size with respect to blocks in a window set region, and calculating focus values by integrating predetermined degrees of quantized DCT coefficient values; and
    an auto focus Digital Signal Processor (DSP) for detecting a maximal focus value while moving a focus lens and performing auto focus adjustment when the focus values are input from the focus value calculating unit.

2. The auto focusing apparatus as set forth in claim 1, wherein the focus value calculating unit calculates the focus values by accumulatively integrating the quantized DCT coefficient values of the blocks in the window set region with respect to a predetermined number of successive frames.

3. The auto focusing apparatus as set forth in claim 1, wherein the compression module comprises:
    an image formatting unit containing memory, the image formatting unit classifying image data according to frame when the image data are input, and blocking each frame into a plurality of blocks having a predetermined size with respect to each frame;
    a DCT unit for performing DCT on the individual blocks that are received from the image formatting unit, and outputting DCT coefficients;
    a rearrangement unit for rearranging the DCT coefficients, which are received from the DCT unit, in a range from a low frequency component to a high frequency component;
    a quantization unit for performing quantization while applying a variable quantization value to the block-based DCT coefficients that are received from the rearrangement unit according to block and degree; and
    a variable length coder for performing variable length coding on the DCT coefficients that are quantized by the quantization unit.

4. The auto focusing apparatus as set forth in claim 2, wherein the compression module comprises:
- an image formatting unit containing memory, the image formatting unit classifying image data according to frame when the image data are input, and blocking each frame into a plurality of blocks having a predetermined size with respect to each frame;
- a DCT unit for performing DCT on the individual blocks that are received from the image formatting unit, and outputting DCT coefficients;
- a rearrangement unit for rearranging the DCT coefficients, which are received from the DCT unit, in a range from a low frequency component to a high frequency component;
- a quantization unit for performing quantization while applying a variable quantization value to the block-based DCT coefficients that are received from the rearrangement unit according to block and degree; and
- a variable length coder for performing variable length coding on the DCT coefficients that are quantized by the quantization unit.

5. The auto focusing apparatus as set forth in claim 1, wherein the focus value calculating unit comprises:
- a fixed step size quantization unit for receiving the DCT coefficient values related to the plurality of blocks of the frame, and quantizing the received DCT coefficients using a fixed step size;
- an integrator for calculating the focus values by integrating the quantized DCT coefficient values in the window set region; and
- a window setting unit for providing set start and end addresses of a window to the integrator.

6. The auto focusing apparatus as set forth in claim 2, wherein the focus value calculating unit comprises:
- a fixed step size quantization unit for receiving the DCT coefficient values related to the plurality of blocks of the frame, and quantizing the received DCT coefficients using a fixed step size;
- an integrator for calculating the focus values by integrating the quantized DCT coefficient values in the window set region; and
- a window setting unit for providing set start and end addresses of a window to the integrator.

7. A method of automatically adjusting a focus of a camera, comprising the steps of:
- acquiring, by an image sensor and an ISP unit, image data according to frame, and transmitting the image data to a compression module;
- blocking, by the compression module, a frame into a plurality of blocks having a predetermined size, performing DCT on the blocks, and outputting DCT coefficients;
- performing, by a focus value calculating unit, a fixed step size quantization and calculating focus values by integrating predetermined degrees of the quantized DCT coefficient values related to blocks within a window when the block-based DCT coefficients are received from the compression module; and
- receiving, by an auto focus DSP, the focus values that are calculated at the third step, calculating a maximal focus value while moving a focus lens of a focus lens unit, and then performing auto focus adjustment.

8. The method as set forth in claim 7, wherein the blocking step comprises the steps of:
- blocking, by the compression module, the frame into a plurality of blocks having a predetermined size; and
- performing, by a frequency conversion unit of the compression module, the DCT on the blocks, and outputting the DCT coefficient values.

9. The method as set forth in claim 7, wherein the performing step comprises the steps of:
- performing, by a fixed step size quantization unit of the focus value calculating unit, the fixed step size quantization when the block-based DCT coefficients are received from the compression module;
- providing, by a window setting unit of the focus value calculating unit, start and end addresses of the window set region to an integrator; and
- calculating, by an integrator of the focus value calculating unit, the focus values by integrating the predetermined degrees of quantized DCT coefficient values.

10. The method as set forth in claim 8, wherein the performing step comprises the steps of:
- performing, by a fixed step size quantization unit of the focus value calculating unit, the fixed step size quantization when the block-based DCT coefficients are received from the compression module;
- providing, a window setting unit of the focus value calculating unit, start and end addresses of the window set region to an integrator; and
- calculating, by an integrator of the focus value calculating unit, the focus values by integrating the predetermined degrees of quantized DCT coefficient values.

11. The method as set forth in claim 9, wherein the step of integrating the predetermined degrees of the quantized DCT coefficient values is performed by accumulatively integrating the predetermined degrees of the quantized DCT coefficient values with respect to the blocks in the window set region related to predetermined successive frames.

12. The method as set forth in claim 10, wherein the step of integrating the predetermined degrees of the quantized DCT coefficient values is performed by accumulatively integrating the predetermined degrees of the quantized DCT coefficient values with respect to the blocks in the window set region related to predetermined successive frames.

13. The method as set forth in claim 7, wherein the receiving step comprises the steps of: receiving, by the auto focus DSP, the calculated focus values, and moving the focus lens of the focus lens unit;
- calculating, by the auto focus DSP, the maximal focus value; and performing, by the auto focus DSP, the auto focus adjustment.

14. The method as set forth in claim 8, wherein the receiving step comprises the steps of:
- receiving, by the auto focus DSP, the calculated focus values, and moving the focus lens of the focus lens unit;
- calculating, by the auto focus DSP, the maximal focus value; and
- performing, by the auto focus DSP, the auto focus adjustment.

* * * * *